United States Patent [19]

Stewart

[11] Patent Number: 4,738,514

[45] Date of Patent: Apr. 19, 1988

[54] CRYSTAL VARIATION COMPENSATION CIRCUIT FOR LIQUID CRYSTAL DISPLAYS

[75] Inventor: Roger G. Stewart, Neshanic Station, N.J.

[73] Assignee: RCA Corporation, Princeton, N.J.

[21] Appl. No.: 819,287

[22] Filed: Jan. 16, 1986

[51] Int. Cl.⁴ .............................................. G02F 1/13
[52] U.S. Cl. .................................. 350/332; 350/331 T
[58] Field of Search ................. 350/332, 333, 331 T, 350/331 R, 336; 340/784, 713, 812, 813

[56] References Cited

U.S. PATENT DOCUMENTS

| | | | |
|---|---|---|---|
| 4,242,679 | 12/1980 | Morozumi et al. | 340/765 |
| 4,298,866 | 11/1981 | Hodemaekers | 350/331 T |
| 4,387,963 | 6/1983 | Brennan | 350/331 |
| 4,390,874 | 6/1983 | Woodside et al. | 340/812 |
| 4,425,027 | 1/1984 | Portmann | 350/331 |
| 4,460,247 | 7/1984 | Hilsum et al. | 350/331 |
| 4,529,968 | 7/1985 | Hilsum et al. | 340/784 |
| 4,570,115 | 2/1986 | Misawa et al. | 340/813 |

OTHER PUBLICATIONS

P. Horowitz "The Art of Electronics", 1980, pp. 29-3-1—Cambridge University Press—1980.

*Primary Examiner*—Stanley D. Miller
*Assistant Examiner*—Tai V. Duong
*Attorney, Agent, or Firm*—E. M. Whitacre; D. H. Irlbeck; L. L. Hallacher

[57] ABSTRACT

A circuit for compensating for crystal variations in a liquid crystal display (LCD) utilizes four crystals arranged outside of the viewing area. Two of the crystals have a capacitance different from that of the other two and serve as reference crystals. The other two crystals serve as detection crystals and can have a capacitance equal to that of the display crystals. The detection crystals are biased to have a capacitance equal to that of the reference crystals. Changes in the detection crystal capacitance results in changes in the voltage across the crystals. The voltage changes are detected in a detection circuit and are applied to an adjustment circuit. The adjustment circuit produces an adjustment signal which is used to adjust the crystal drive voltage and to adjust the detection circuit.

20 Claims, 3 Drawing Sheets

CRYSTAL VARIATION COMPENSATION CIRCUIT FOR LIQUID CRYSTAL DISPLAYS

BACKGROUND

This invention relates generally to driver circuits for liquid crystal displays (LCD's) and particularly to a circuit for compensating for variations in the characteristics of the crystals of such displays.

The use of liquid crystal displays (LDC's) in instances where a visual display is required, is increasing rapidly. Because of their low power consumption and economy, LCDs are being used to replace cathode ray tubes for many uses requiring a visual display. Unlike CRTs, liquid crystals show a rapid change in light output over a narrow range of driving voltages just above a threshold voltage. However, keeping a good grey scale, in a monochrome display, or color uniformity, in a color display, requires accurate control of the LCD drive voltages in the region of the threshold voltage. Manufacturing liquid crystals with uniform characteristics is an achievable goal with existing technology. However, the turn-on voltage characteristics of liquid crystals vary substantially over time because of such factors as temperature changes, aging, thickness of the crystals, and for other reasons. Because of these variations in characteristics, even when the crystals within a given display are manufactured with substantially identical turn-on characteristics, matching the drive voltage circuitry to the turn on voltage of the crystals is extremely difficult. The difficulty is increased when the changes are not permanent. For example, temperature changes can cause substantial changes in the crystal characteristics. However, the temperature changes are not permanent. Accordingly, the light output of a portable LCD can vary substantially as the display is moved from one environment to another. For these reasons there is a need for a circuit for compensating for crystal variations in a LCD. The present invention fulfills this need.

SUMMARY

A circuit for compensatng for crystal variations in a liquid crystal display (LCD) having a drive voltage circuit includes a plurality of compensation crystals arranged outside the viewing area of the LCD. A first portion of the compensation crystals has a first capacitance, and a second portion of the compensation crystals has a second capacitance greater than the first capacitance. The compensation crystals are connected whereby the crystals of one of the portions function as reference crystals and the crystals of the other portion function as detection crystals. The detection crystals are biased so that all of the compensation crystals have substantially the same capacitance. A detection circuit includes the compensation crystals and produces a differential signal in response to characteristic changes of the detection crystals. An adjustment circuit is responsive to the differential signal and produces an adjustment signal representative of the differential signal. The adjustment signal is applied to the detection crystals and to the drive voltage circuit whereby changes in the crystals are compensated.

DETAILED DESCRIPTION

Figure 1:
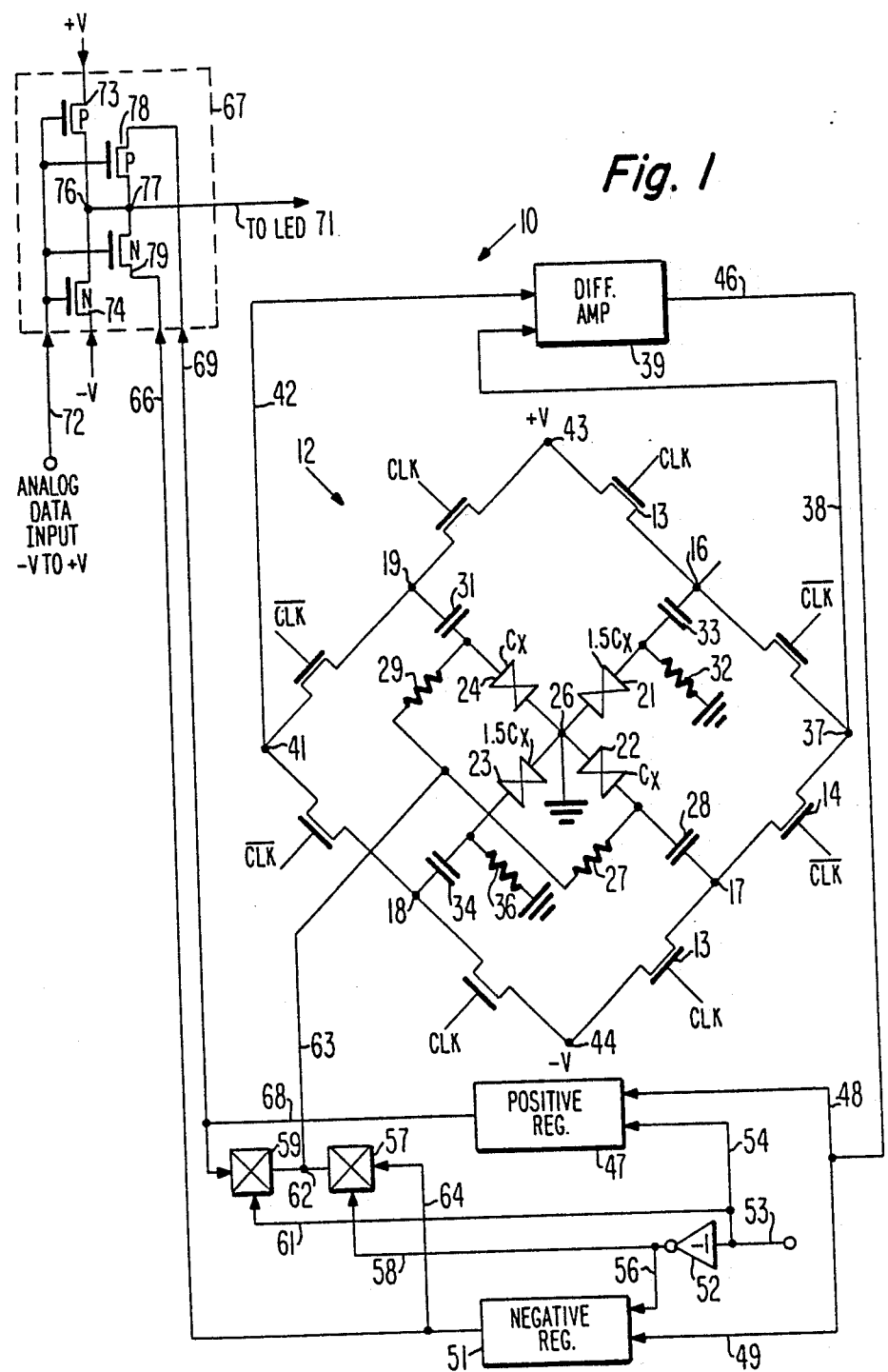
FIG. 1 is a preferred embodiment of a circuit for compensating for crystal variations in a LCD.

In FIG. 1, a circuit 10 for compensating for the variations of crystals of a liquid crystal display 15 (FIG. 3) includes a detection circuit 12. The detection circuit 12 is in the form of a bridge, each leg of which includes a positive polarity voltage sensitive transfer gate 13 and a negative polarity voltage responsive transfer gate 14. The transfer gates 13 and 14 in each of the legs are coupled at junctions 16, 17, 18 and 19. A plurality of compensation crystals 21, 22, 23 and 24 are connected at a grounded junction 26 and to the junctions 16, 17, 18 and 19, respectively.

Figure 3:
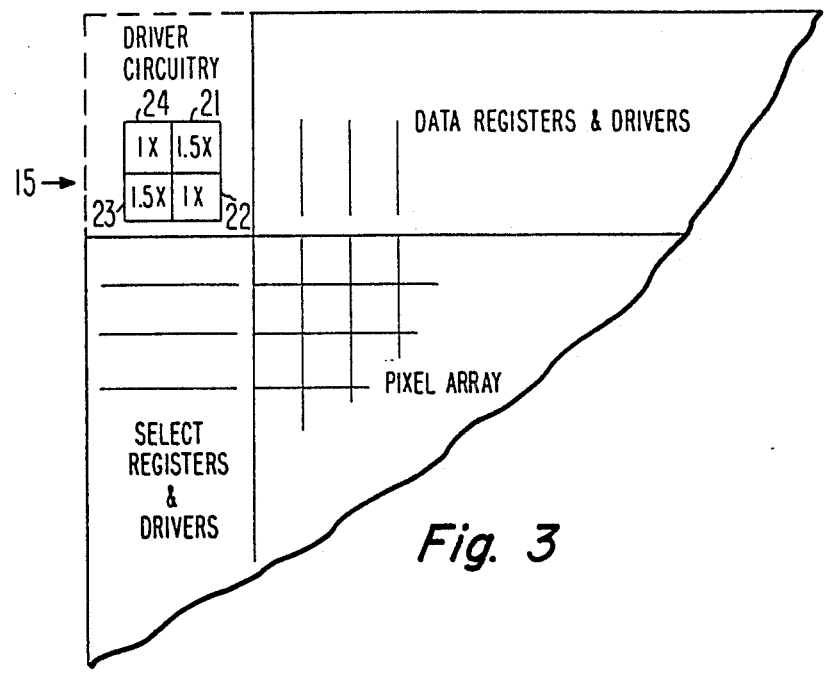
FIG. 3 is a simplified portion of a LCD showing the relationship of the compensation crystals and the display area crystals.

In FIG. 3, the compensation crystals 21 to 24 are arranged outside the viewing area of the LCD and are used to compensate for capacitance changes which occur to the crystals within the LCD because of aging, temperature changes, variations in thickness due to manufacturing, etc. The crystals 22 and 24 have substantially the same capacitance $C_X$ as the crystals within the LCD and serve as detection pixels in the compensation circuit. The capacitance of the crystals 21 and 23 exceeds that of the detection crystals 22 and 24 by a preselected amount, such as 50%. The crystals 21 and 23 serve as reference crystals in the detection circuit. The crystal 22 is voltage biased through an RC filter including a resistor 27, a capacitor 28 and the capacitance $C_X$ of the crystal. Similarly, the detection crystal 24 is voltage biased through an RC filter including a resistor 29 and a capacitor 31 and the capacitance $C_X$ of the crystal. The capacitance of the capacitors 28 and 31 is much greater than the capacitance $C_X$ of the crystals 22 and 24. The voltage applied to the reference crystal 21 is applied through an RC filter including a resistor 32, a capacitor 33, and the capacitance of the crystal. A capacitor 34 and resistor 36 also form an RC filter for the reference crystal 23. The capacitance of the capacitors 33 and 34 is much greater than the capacitance of the crystals 21 and 23. A node 37 of the bridge circuit 12 is coupled by a line 38 to one input terminal of a differential amplifier 39. A node 41, directly opposite from the node 37, is coupled to another input terminal of the differential amplifier 39 by a line 42. The other two nodes 43 and 44 of the bridge circuit 12 are positively and negatively voltage biased, respectively.

The output of the differential amplifier 39 is connected to the input terminal of a positive voltage regulator 47 by lines 46 and 48. The output of the differential amplifier 39 is also connected to the input terminal of a negative voltage regulator 51 by the line 46 and a line 49. An inverter 52 receives polarity control signals over an input line 53. The polarity control signal is applied as a control input to the positive voltage regulator 47 by a line 54. Also, the output of the inverter 52 is applied as a control input to the negative voltage regulator 51 by a line 56. A transfer gate 57 receives the output of the inverter 52 over a line 58. Another transfer gate 59 receives the polarity control signal over a line 61. The transfer gates 57 and 59 can be the transistor type similar to the gates 13 and 14 with the lines 58 and 61 being coupled to the control electrodes of the transistors.

When this type of transfer gate is used, both the transfer gates 57 and 59 have the same polarity and, thus, are alternately on and off in response to the polarity control signal on the line 53. A junction 62, between the transfer gates 57 and 59, is coupled to the filter resistors 27 and 29 by a line 63. The output voltage of the negative regulator 51 is coupled by a line 64 to the transfer gate 57 and by a line 66 to an input of a driver circuit 67. The output voltage of the positive regulator 47 is coupled by a line 68 to the transfer gate 59 and by a line 69 to another input terminal of the driver circuit 67.

An output line 71 of the driver circuit 67 is coupled to the crystals of the LCD in known manner. Analog data, which varies from −V to +V, for example ±5 volts, is applied to the driver circuit 67 by an input line 72. The line 72 is coupled to the control electrode of inverting transfer gates 73 and 74. The transfer gates 73 and 74 have opposite polarity. Accordingly, the gate 73 is conductive when positive analog data are coming in from line 72 and the gate 74 is conductive when negative analog data are applied to the line 72. The output line 71 is coupled to a junction 76 between the transfer gates 73 and 74 and thus, varies between a plus and a minus voltage V, in accordance with the polarity of the signal on the input line 72. The line 71 is also coupled to a junction 77 between oppositely poled inverting transfer gates 78 and 79. The junctions 76 and 77 are electrically coupled. The gates 73 and 78 are similarly poled, as are the gates 74 and 79. The control electrodes of the transfer gates 78 and 79 are coupled to the input line 72. The gates 78 and 79 are coupled to the positive voltage regulator 47 and negative voltage regulator 51 by the input line 69 and 66, respectively. Accordingly, the voltage on the output line 71 is adjusted by the regulators 47 and 51 in accordance with the polarity of the signal on the input line 72.

Briefly stated, the compensation crystals 21 to 24 develop a differential signal across the detection circuit 12 in response to changes in the detection crystals 22 and 24. The differential signal is applied to an adjustment circuit which includes the differential amplifier 39, the regulators 47 and 51, and the transfer gates 57 and 59. The adjustment circuit produces an adjustment signal which adjusts the output signal on the line 71 of the drive circuit 67, and which also adjusts the biasing voltage on the detection crystals 22 and 24. The adjustment signal rebalances the detection circuit 12 and crystal characteristic changes are compensated.

In operation, either all of the positive transfer gates or all of the negative transfer gates are simultaneously turned on in synchronization with the polarity of the polarity control signal on the line 53. The reference crystals 21 and 23 are biased to keep them in the minimum capacitance off state. The detection crystals 22 and 24 are alternately biased positive and negative by the voltage regulators 47 and 51 through the transfer gates 57 and 59, and the line 63. This biasing of the detection crystals 22 and 24 causes their total capacitance to equal that of the reference crystals 21 and 23. When the positive transfer gates 13, in the legs of the bridge circuit 12, are conductive the compensation crystals 21 and 24 are connected to the positive node 43, and are positively charged. Simultaneously, the compensation crystals 22 and 23 are connected to the negative node 44, and are negatively charged. When the negative transfer gates 14, in the legs of the bridge circuit 12, are made conductive, the reference crystal 21 and the detector crystal 22 are connected to the node 37. Also, the reference crystal 23 and the detection crystal 24 are connected to the node 41. When the capacitance of the detection crystals equals that of the reference crystals the net voltage between each of the nodes 37, 41 and grounded junction 26 is zero, and the differential amplifier 39 receives no differential voltage and produces no output voltage on the line 46. However, changes in the characteristics of the detection crystals 22 and 24, due to temperature changes aging etc, are substantially the same as those of the crystals within the viewing area of the LCD. When a crystal characteristic change occurs, the capacitance of the detection crystals 21 and 23 is different from that of the reference crystals 22 and 24. Under this condition, when the transfer gates 14 are rendered conductive and connect the crystals to the nodes 37 and 41, a differential voltage exists between the nodes 37 and 41 and ground. This voltage is applied to the differential amplifier 39 which produces an output on the line 46. The output voltage on the line 46 is applied to the voltage regulators 47 and 51 in accordance with the polarity of the polarity control signal on the line 53 to cause the voltage on either of the lines 66 or 69 to change and produce a change in the drive voltage on the output line 71 of the driver circuit 67. The regulators 47 and 51 also change the biasing on the detector crystals 22 and 24 because of the connection to the detector crystals through the transfer gates 57 and 59. Accordingly, the capacitance of the crystals is adjusted to rebalance the bridge 12 in accordance with the changed conditions until rebalancing is required because of another change of crystal characteristics.

Figure 2:
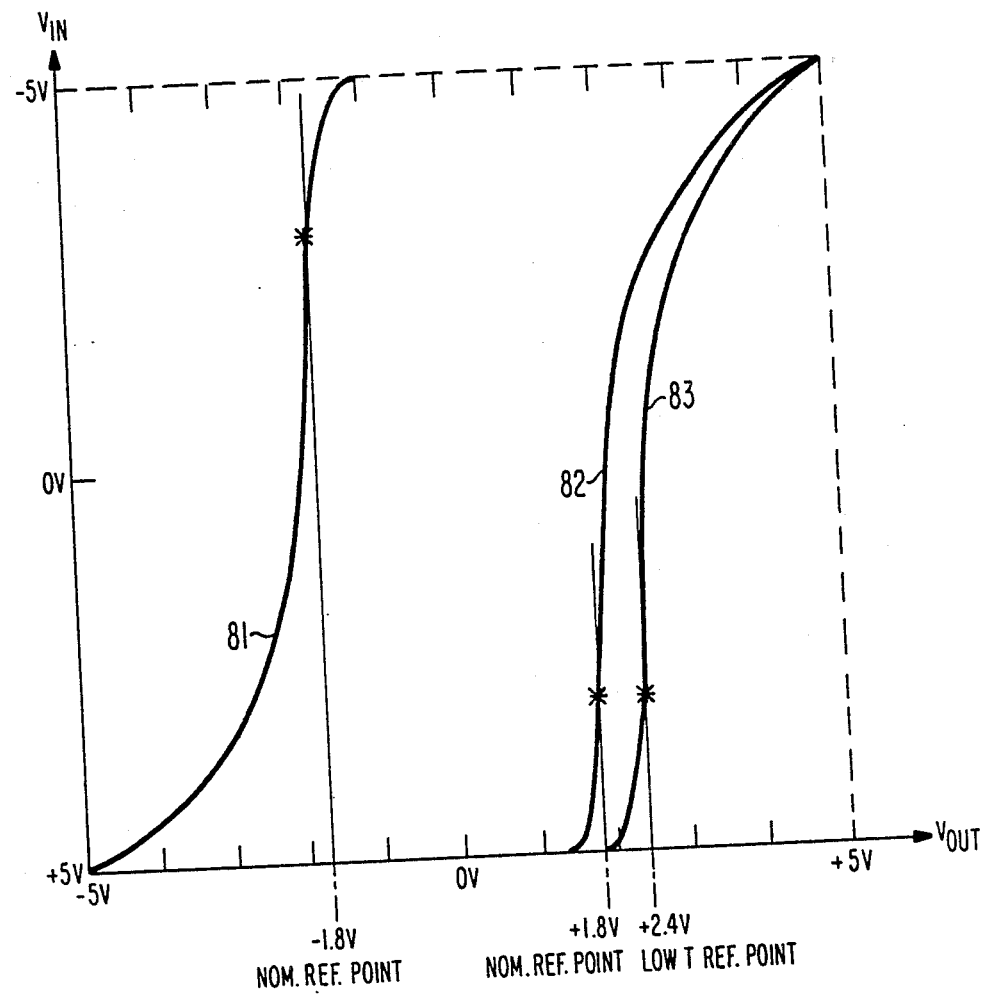
FIG. 2 shows the LCD threshold and gamma correction achievable with the preferred embodiment.

FIG. 2 shows how the voltage circuit compensates for capacitance variations of the crystals in the LCD. The abscissa is the voltage on the output line 71 of the driver circuit 67, and the ordinate is the input voltage applied to the input line 72. The curve 81 is the output on the line 71 for a negative analog input on the input line 72 with a nominal threshold level of −1.8 volts for the crystals of the LCD. The curve 82 is a curve with the nominal threshold of +1.8 voltage for positive input on the line 72. Curve 83 shows how the inventive circuit shifts the curve 82 when the threshold level of the crystals of the LCD increases 0.6 volts to +2.4 volts due to a temperature change, or a change in some other crystal characteristic. With the invention, when the display is returned to the temperature which existed prior to the shift, the inventive circuit will shift the threshold voltage back to the nominal +1.8 volts.

Figure 4:
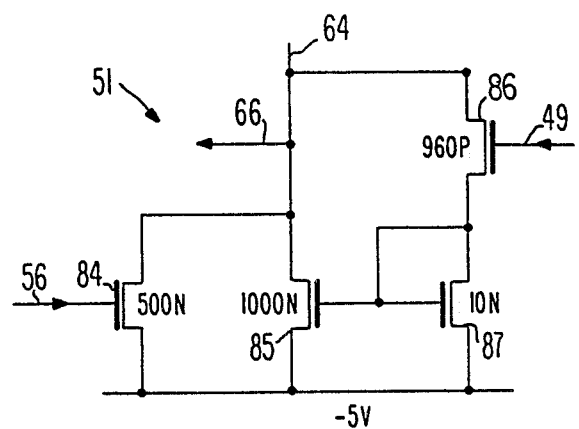
FIG. 4 shows voltage regulators, which can be used with the invention, in more detail.

FIG. 4 shows the regulator 51 in more detail. The regulator includes four transfer gates 84, 85, 86, 87. The polarity control signal is applied by the line 56 to the control electrode of the transfer gate 84. The output voltage of the differential amplifier 39 is applied by the line 49 to the control electrode of the transfer gate 86. When the polarity control signal on the line 56 is low the regulator is enabled and the signal in the lines 64 and 66 is regulated. When the polarity control signal on the line 56 is high the lines 64 and 66 are clamped to the most negative potential, e.g. −5 volts. The positive regulator 47 is similar to the negative regulator 51 but the polarity of the transfer gates is the opposite from those of the negative regulator 51. The regulators 47 and 51 can be the type described in U.S. Pat. No. 4,061,962.

What is claimed is:

1. A circuit for compensating for variations in the display crystals of a liquid crystal display (LCD) including a drive voltage circuit, comprising:

a plurality of compensation crystals arranged outside the viewing area of said LCD, a first portion of said compensation crystals having a first capacitance, and a second portion of said compensation crystals having a second capacitance greater than said first capacitance, said first and second portions being connected whereby the crystals of one of said portions function as reference crystals and the crystals of the other portion function as detection crystals;

means for biasing said detection crystals so that all of said compensation crystals have substantially the same capacitance;

detection bridge circuit means, including four junctions and said compensation crystals connected across opposing sides of bridge circuit means, and said detection crystals connected across the other opposing sides of said bridge circuit means, for producing a differential signal across opposed nodes of said bridge circuit in response to character changes of said detection crystals; and adjustment circuit means responsive to said differential signal for producing an adjustment signal representative of said differential signal, and for applying said adjustment signal to said means for biasing and to said drive voltage circuit whereby changes in said display crystals are compensated.

2. The circuit of claim 1 wherein said detection crystals have said first capacitance and said reference crystals have said second capacitance.

3. The circuit of claim 2 wherein said first capacitance is substantially equal to the capacitance of said display crystals of said LCD.

4. The circuit of claim 3 wherein said second capacitance is approximately 1.5 times said first capacitance.

5. The circuit of claim 3 wherein said means for biasing biases said detection crystals so that said detection crystals have substantially the same capacitance as said reference crystals.

6. The circuit of claim 5 wherein said adjustment circuit means includes a differential amplifier arranged across said bridge circuit.

7. The circuit of claim 6 wherein said adjustment circuit means further includes voltage regulation means responsive to said differential amplifier for applying said adjustment signal to said means for biasing and to said drive voltage circuit.

8. The circuit of claim 7 wherein said means for biasing includes RC filters for applying a biasing voltage to said detection crystals.

9. The circuit of claim 1 wherein said means for biasing biases said detection crystals so that said detection crystals have substantially the same capacitance as said reference crystals.

10. The circuit of claim 1 wherein each side of said bridge circuit includes a positive and a negative voltage responsive transfer means connected in series at junctions.

11. The circuit of claim 10 wherein said reference crystals are connected across two of said junctions in opposed sides of said bridge, and wherein said detection crystals are connected across the other two of said junctions whereby said reference crystals and said detection crystals are alternately connectable across the nodes of said bridge circuit in response to negative and positive clocking voltages.

12. The circuit of claim 11 wherein said adjustment circuit means includes a differential amplifier arranged across said bridge circuit.

13. The circuit of claim 12 wherein said adjustment circuit means further includes voltage regulation means, responsive to said differential amplifier, for applying said adjustment signal to said means for biasing and to said drive voltage circuit.

14. The circuit of claim 13 wherein said means for biasing includes RC filters for applying a biasing voltage to said detection crystals.

15. The circuit of claim 14 wherein said second capacitance is approximately 1.5 times said first capacitance.

16. The circuit of claim 2 wherein said means for biasing biases said detection crystals so that said detection crystals have substantially the same capacitance as said reference crystals.

17. The circuit of claim 16 wherein said adjustment circuit means includes a differential amplifier arranged across said bridge circuit.

18. The circuit of claim 17 wherein said adjustment circuit means further includes voltage regulation means responsive to said differential amplifier for applying said adjustment signal to said means for biasing and to said drive voltage circuit.

19. The circuit of claim 18 wherein said means for biasing includes RC filters for applying a biasing voltage to said detection crystals.

20. The circuit of claim 16 wherein said means for biasing includes RC filters for applying a biasing voltage to said detection crystals.

* * * * *